Aug. 27, 1957 J. C. TRAVILLA, JR Re. 24,349
RAILWAY TRUCK
Original Filed May 24, 1946 2 Sheets-Sheet 1
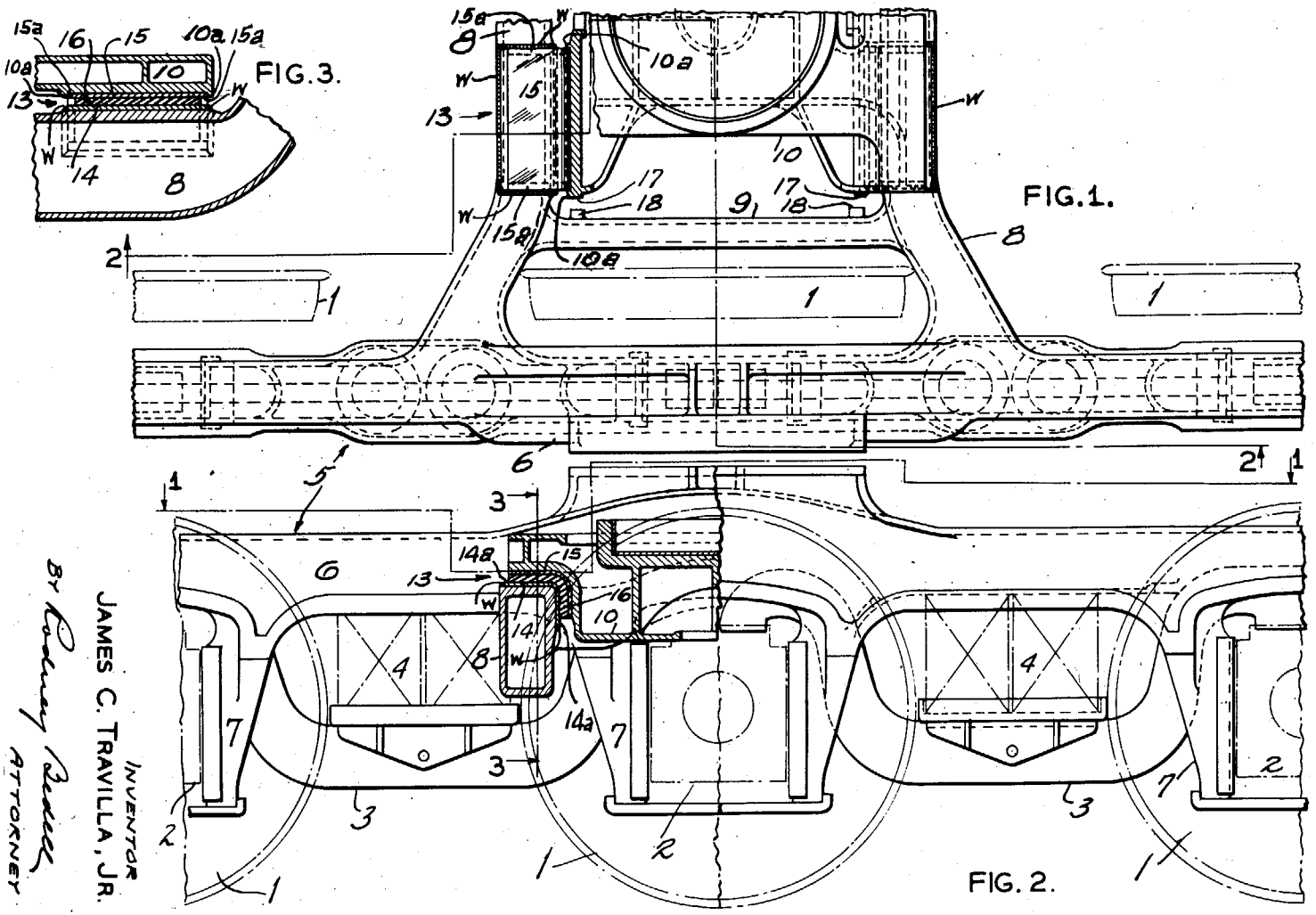
INVENTOR
JAMES C. TRAVILLA, JR.
BY Rodney Bedell
ATTORNEY

RAILWAY TRUCK

Original Filed May 24, 1946 2 Sheets-Sheet 2

INVENTOR
JAMES C. TRAVILLA, JR.

BY Rodney Bedell
ATTORNEY.

United States Patent Office

Re. 24,349
Reissued Aug. 27, 1957

24,349

RAILWAY TRUCK

James C. Travilla, Jr., Ladue, Mo., assignor to General Steel Castings Corporation, Granite City, Ill., a corporation of Delaware Original No. 2,740,359, dated April 3, 1956, Serial No. 346,821, April 6, 1953, which is a continuation of application Serial No. 671,996, May 24, 1946. Application for reissue November 8, 1956, Serial No. 622,724

12 Claims. (Cl. 105—193)

Matter enclosed in heavy brackets [ ] appears in the original patent but forms no part of this reissue specification; matter printed in italics indicates the additions made by reissue.

This application is a continuation of a copending, but now abandoned, application filed May 24, 1946, Serial No. 671,996. The invention relates to railway trucks and particularly to the type having a frame and a load-carrying separate bolster which is not spring supported from the truck frame but is provided with a desired amount of lateral movement of the bolster relative to the truck frame.

The invention is adapted for trucks used in non-passenger carrying vehicles, including locomotives, and particularly for motor trucks used in diesel locomotives where a spring support for the truck frame on the wheels and axles will offer sufficient spring action for the intended purpose as distinguished from trucks for passenger carrying vehicles which include a spring support between the truck frame and bolster in addition to the spring support between the truck frame and the wheels and axles.

Trucks embodying separate bolsters, which are non-spring supported from the truck frame but provide for lateral movement of the bolster, have previously been made in which the bolster is supported from the truck frame either by swing hangers or by rocker or roller centering devices, but some trouble has been experienced with such arrangements in controlling lateral movement of the bolster relative to the truck frame.

The main object of the present invention is to provide for relative lateral movement of the truck frame and bolster by means, other than that described briefly above, which will snub or damp such relative movement and will prevent resonant lateral oscillations, which means, at the same time, will center the bolster in the frame and cushion vertical and longitudinal shocks between the bolster and truck frame. This is accomplished by using devices interposed between the truck frame and bolster which consist of rubber or rubber-like material or by using such devices together with other means for snubbing the movements of the bolster relative to the truck frame or for limiting such movements.

Another object is to simplify and lighten the truck structure by using a means for controlling lateral movement and cushioning vertical and longitudinal shocks of the type described which is much simpler and of less weight than devices heretofore used.

Another object is to position the devices which support the bolster from the truck frame so that the bolster is stabilized against tilting while utilizing such devices to control lateral movements of the bolster and cushion vertical and longitudinal shocks between bolster and truck frame.

Another object is to reduce maintenance over that experienced with rockers, rollers, or swing hangers. Where rubber has been substituted for rollers on locomotive tenders, a great maintenance saving has resulted, in addition to a lower first cost.

These and other detail objects as will appear below are attained by the structure illustrated in the accompanying drawings, in which:

Figure 1 is a top view, partially in horizontal section, along line 1—1 of Figure 2 and shows a longitudinal half of a railway truck embodying one form of the invention.

Figure 2 is a side elevation view and longitudinal section taken on line 2—2 of Figure 1.

Figure 3 is a detail transverse vertical section on line 3—3 of Figure 2.

Figure 5:
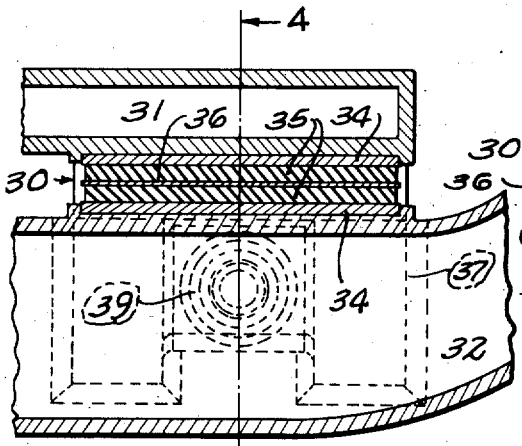
Figure 5 is a detail vertical transverse section taken approximately on line 5—5 of Figure 4.

The railway truck illustrated in Figures 1, 2, and 3 comprises the usual wheel and axle assemblies 1, journal boxes 2, longitudinal equalizers 3, carried on the boxes, equalizer springs 4, a truck frame 5 preferably consisting of a one piece casting including wheel pieces 6 with depending pedestal legs 7, receiving journal boxes 2 between them, transverse spaced transoms 8 and braces 9 between the transoms.

A bolster 10 is supported on and extends between transoms 8. Bolster 10 and transoms 8 present substantially parallel horizontal and vertical faces and positioned between these faces substantially at each corner of bolster 10 is a yielding assembly 13 mounting the bolster and comprising angular steel plates 14, 15 bounded to a pad 16, of rubber-like material, therebetween.

The vertical and horizontal portions of each steel plate 14 extend beyond the edges of yieldable pad 16 at 14a and these extensions are welded to the associated transom 8 as indicated at W. Each steel plate 15 extends longitudinally of the bolster beyond yieldable pad 16 and its extensions 15a are fitted between lugs 10a on the bolster to position plate 15 relative to the bolster.

The vertical portions of pads 16 are compressed between the bolster and transoms and cushion shocks applied longitudinally of the truck without permitting substantial relative movement longitudinally of the truck.

The horizontal portions of pads 16 are compressed between the bolster and transoms and cushion the vertical load without providing for substantial relative vertical movement. If it were not for the resistance to relative longitudinal and vertical movements between the bolster and the truck frame transoms afforded by the resistance of the vertical and horizontal pad portions, respectively, to compression, the relative movement of the bolster and transoms longitudinally of the truck would also be resisted by the shear value of the horizontal portions of the pads and the relative movement of the bolster and transoms vertically would also be resisted by the shear value of the vertical portions of the pads, and there would then be a considerable amount of relative movement of the parts due to the application of forces in both longitudinal and vertical directions.

Both the horizontal and vertical portions of the pad may yield substantially to shearing forces applied laterally or transversely of the truck to accommodate such relative movement of the bolster and transoms and the pads also tend to center the bolster when lateral forces are spent. Thus the structure lessens the shocks due to track irregularities, curves and other causes tending to move the wheel and axle assemblies laterally relative to the vehicle body. The structure also snubs or damps such movements. Stops 17 and 18 limit the relative lateral movement of the bolster and frame.

Figure 4:
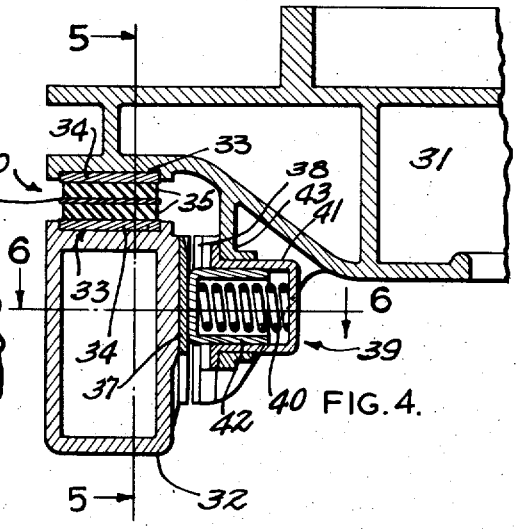
Figure 4 is a detail longitudinal vertical section taken approximately on line 4—4 of Figure 5.
Figure 6:
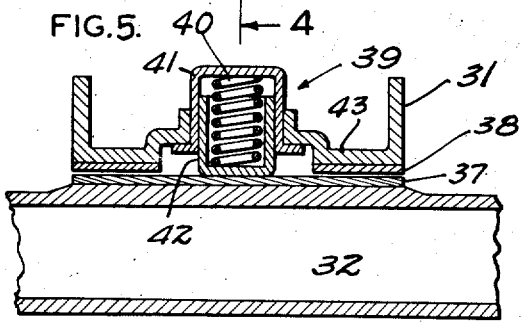
Figure 6 is a detail horizontal section taken approximately on line 6—6 of Figure 4.

In the embodiment shown in Figures 4, 5, and 6, substantially horizontal yieldable assemblies 30 are positioned between bolster 31 and transoms 32 in recesses 33 in adjacent faces thereof and substantially at the four corners of the bolster to support and cushion the bolster and to provide for lateral and longitudinal movement of the bolster relative to transoms 32, to snub such movement and to center the bolster in the truck frame after such movement. Assemblies 30 comprise parallel substantially horizontal steel plates 34 bonded to yieldable pads 35, preferably rubber, bonded to an intermediate steel plate 36.

Bolster 31 and transoms 32 are provided with wear plates 37, 38, respectively, to limit movement of bolster 31 relative to transoms 32 longtiudinally of the truck. Spring snubbing devices 39 are arranged to snub relative movement of the bolster and transoms transversely of the truck. Each device 39 comprises a compression spring 40 positioned in telescoping housings 41, 42, the former being received in a recess in bolster web 43 and the latter being thrust against the side of the transom.

If spring-snubbing devices are used adjacent one transom only, they snub relative movement of the bolster and transoms transversely of the truck by engagement of the spring caps 42 with the plates 37 on that transom while plates 37 on the other transom slidably engage plates 38 on the bolster and provide additional snubbing action. If spring-snubbing devices are used adjacent both transoms, the snubbing is effected by engagement of the spring caps with the corresponding transoms except when a thrust in one longitudinal direction is greater than the spring pressure in the opposite direction, as during the application of pullng or retarding forces between the truck and body, in which case the plates 37, 38 at one side of the bolster will also be thrust against each other and provide additional lateral snubbing action.

As described above, the yieldable pads between the bolster and transoms provide for lateral movement of the bolster relative to the truck frame and center the bolster laterally in the truck frame. Such lateral motion of the bolster is damped by the yieldable pads and resonant lateral oscillations of the bolster are prevented. The yieldable pads cushion longitudinal and vertical shocks also.

By placing the yielding mountings at the four corners of the bolster, they provide a stable cushioned support for the bolster and its load. If the rubber were placed under the center plate only instead of being placed at a distance from the center plate, the vehicle body would tend to tip over unduly; that is, the support would be unstable. It would then be necessary to provide some additional means of stabilizing the supported load.

The details of the construction may be varied substantially without departing from the spirit of the invention and the exclusive use of such modifications as come within the scope of the claims is contemplated.

What is claimed is:

1. In a railway truck, spaced frame transoms each extending transversely of the truck and having upwardly and laterally disposed surfaces merging in an angular formation, a bolster with its lower portion recessed angularly at each side to extend over and alongside the adjacent transom angular formation, an angular device fitting between each transom and the adjacent bolster recess and comprising an L-shaped plate secured to a transom angular formation and an L-shaped plate positioned in the associated bolster recess, there being an L-shaped pad of rubber-like material between said plates and subjected to initial compression thereby to cushion vertical load and forces transmitted between transom and bolster longitudinally of the truck, said plates being bonded to opposite sides of said pad and distorting same under shear to yielding accommodate relative movement of the transoms and bolster transversely of the truck.

2. In a railway truck, spaced transoms, a bolster supported by and extending between said transoms, said bolster and said transoms presenting opposing substantially horizontal and vertical faces extending transversely of the truck, a yieldable assembly at each side of the bolster and positioned between the corresponding bolster and transome faces, each assembly comprising a pair of L-shaped metal plates and an L-shaped rubber pad between and secured to said plates, each of said plates having portions extending beyond the edge of the associated rubber pad, the extending portions of one plate being held to the associated transom and the extending portions of the other plate being held to the bolster.

3. In a railway truck, wheeled axles, a rigid truck frame mounted thereon and including portions spaced apart longitudinally of the truck and having substantially flat, upwardly facing surfaces extending horizontally transversely of the truck, a substantially rigid bolster having a load-carrying center plate and having substantially flat, downwardly facing surfaces extending horizontally transversely of the truck and opposing said frame surfaces, and flat rubber-like pad members between said opposing surfaces of the frame and bolster, said pad members and the corresponding *portions of the* upwardly and downwardly facing surfaces on the [bolster and frame] *frame and bolster respectively* being spaced apart longitudinally of the truck a greater distance than the diameter of said center plate, said pad members forming a stable support and the sole support for the bolster and its load on the truck frame and holding the bolster against vertical tilting, longitudinally and transversely of the truck relative to the truck frame, solely by the resistance of said pad members to compression, said pad members being restrained against bodily movement transversely of the truck frame, but being adapted to yield substantially in shear under forces tending to move the bolster horizontally transversely of the truck frame, and forming [the sole] means [connecting] *between* the bolster and frame (and) controlling their relative transverse motion, said pad members being substantially free of distortion in a direction normal to their upper and lower faces when subjected to said forces.

4. In a railway truck, wheeled axles, a rigid truck frame mounted thereon and including substantially flat, horizontal upwardly facing surfaces and substantially flat, upright faces adjacent to said upwardly facing surfaces, a substantially rigid bolster having a load-carrying center plate and having substantially flat, horizontal, downwardly facing surfaces spaced apart longitudinally of the truck a great distance than the diameter of said center plate and opposing said frame upwardly facing surfaces said bolster having substantially flat, upright faces opposing said frame upright faces, rubber-like pad members having flat portions between said opposing horizontal surfaces of the frame and bolster and forming a stable support for the bolster and its load and holding the bolster against vertical tilting, longitudinally of the truck relative to the truck frame, solely by the resistance of said pad members to compression, other pad members disposed between said opposing upright faces of the frame and bolster and resisting relative movement of the bolster and frame longitudinally of the truck, all of said pad members being held against bodily movement of the frame and bolster and being free of compression under forces tending to move the bolster transversely of the truck frame but yielding in shear to such forces to reduce or eliminate shocks arising therefrom.

5. In a railway truck, three wheel and axle assemblies, a bolster provided with a vehicle body-supporting center plate above the middle axle, a rigid truck frame supported from said assemblies and including transverse transoms at opposite sides of the middle axle, said bolster and transoms having opposing substantially flat horizontal downwardly and upwardly facing surfaces, respectively, there being rubber pad members between said opposing surfaces of the bolster and transoms and including portions spaced apart longitudinally and transversely of the truck a greater distance than the diameter of the body-supporting portion of said center plate and stably supporting the bolster on the transoms against tilting vertically relative to the truck frame, said pad members being held against bodily movement relative to the truck frame and bolster but being of sufficient thickness to yield substantially in shear under forces tending to move the bolster transversely of the truck frame.

6. In a railway truck, transverse transom structure, a bolster, elongated flat pad members of rubber-like material extending horizontally of the bolster and subject to compression only under vertical load and mounting the bolster on the transom structure and providing for movement of the bolster relative to the transom structure in a horizontal direction laterally of the truck, and springs compressed longitudinally of the truck between the bolster and the transom structure to damp such relative movement.

7. In a railway six wheel truck, three wheel and axle assemblies, a truck frame supported from said assemblies and including transverse transoms at opposite sides of the middle axle, a bolster extending longitudinally of the truck over said axle and transoms, means supporting the bolster from the transoms and providing for movement of the bolster relative to the transoms transversely of the truck, the transoms limiting the movement of the bolster longitudinally of the truck, and structure snubbing relative movement of the bolster and transoms transversely of the truck and comprising opposing elements on the transoms and bolster slidable over each other transversely of the truck, and spring structure thrusting said elements into contact with each other.

8. In a railway truck, spaced wheel and axle assemblies, equalizers between said assemblies, a truck frame spring-supported on said equalizers with wheel pieces outwardly of said wheels and connected by transverse transoms spaced apart longitudinally of the truck, a bolster positioned at least in part between said transoms and between said wheel pieces and terminating inwardly of the wheels and supported by the transoms for movement transversely of the truck, a spring compressed between the bolster and at least one of said transoms and thrusting the bolster longitudinally of the truck towards the other transom, the bolster and the other transom being provided with opposing friction elements interengaging when the bolster is moved in the direction of the spring thrust.

9. In a railway truck, a truck frame having spaced transoms, a laterally movable bolster having downwardly facing portions overlying upwardly facing portions of said transoms, flat horizontally disposed pads of laterally yielding material supporting the bolster on the frame, said transoms and bolster having opposing upright members on each side of the transverse center line of the truck, at least one of said members being provided with a spring controlled snubbing device engaging the opposing member.

10. In a railway truck, spaced transoms, a bolster, flat horizontal pads of rubber-like material applied to the top faces of said transoms and mounting said bolster on said transoms and resisting vertical tilting of the bolster but yielding under shear forces applied transversely of the truck to provide for movement of said bolster horizontally and relative to said transoms to dissipate lateral shocks between the frame and bolster, and a structure between opposing vertical faces of the bolster and transom which extend transversely of the truck, said structure yielding substantially under forces applied to the structure by said faces longitudinally of the truck to absorb longitudinal shock between the frame and bolster due to acceleration and retardation.

*11. In a railway truck, wheeled axles, a rigid truck frame mounted thereon and including portions spaced apart longitudinally of the truck and having substantially flat, upwardly facing surfaces extending horizontally transversely of the truck, a substantially rigid bolster having a load-carrying center plate and having substantially flat, downwardly facing surfaces extending horizontally transversely of the truck and opposing said frame surfaces, and flat rubber-like pad members between said opposing surfaces of the frame and bolster, said pad members and the corresponding upwardly and downwardly facing surfaces on the frame and bolster respectively having portions spaced apart longitudinally and transversely of the truck a greater distance than the diameter of said center plate whereby said pad members form a stable support and the sole support for the bolster and its load on the truck frame and hold the bolster against vertical tilting, longitudinally and transversely of the truck relative to the truck frame, solely by the resistance of said pad members to compression, means securing the upper and lower faces of said pad members to the bolster and frame respectively, but said pad members being adapted to yield substantially horizontally in shear under forces tending to move the bolster horizontally transversely of the truck frame and thereby yieldingly resist such relative movement of said bolster and frame, said pad members being substantially free of distortion in a direction normal to their upper and lower faces because of said forces.*

*12. In a railway truck, wheel and axle assemblies, a bolster provided with a body-supporting circular center plate above the level of said axles, a rigid truck frame supported from said assemblies and including transverse transoms, said bolster and transoms having opposing substantially flat horizontal downwardly and upwardly facing surfaces, respectively, spaced apart lengthwise of the frame a greater distance than the diameter of said center plate, there being rubber pad members between said opposing surfaces of the bolster and transoms and stably supporting the bolster on the transoms against tilting vertically relative to the truck frame, said pad members being held against bodily movement relative to the truck frame and bolster but being of sufficient thickness to yield substantially in shear under forces tending to move the bolster transversely of the truck frame.*

References Cited in the file of this patent or the original patent

UNITED STATES PATENTS

| | | |
|---|---|---|
| 1,924,237 | Glascodine | Aug. 29, 1933 |
| 1,992,506 | Sauer | Feb. 26, 1935 |
| 2,099,031 | Neal et al. | Nov. 16, 1937 |
| 2,259,049 | Swan et al. | Oct. 14, 1941 |
| 2,284,696 | Travilla et al. | June 2, 1942 |
| 2,317,398 | Nystrom et al. | Apr. 27, 1943 |
| 2,496,644 | Travilla | Feb. 7, 1950 |